United States Patent [19]
Scaramucci et al.

[11] 3,741,523

[45] June 26, 1973

[54] SEAT FOR BALL VALVE

[75] Inventors: Domer Scaramucci, Oklahoma City; Ladd M. Adams, Norman, both of Okla.

[73] Assignee: Balon Corporation, Oklahoma City, Okla.

[22] Filed: Aug. 30, 1971

[21] Appl. No.: 175,871

[52] U.S. Cl. ............................ 251/315, 251/362
[51] Int. Cl. .................................... F16k 5/06
[58] Field of Search ................. 251/315, 333, 334, 251/317, 362, 363, 309

[56] References Cited
UNITED STATES PATENTS

| | | | |
|---|---|---|---|
| 3,669,406 | 6/1972 | Moore | 251/315 |
| 3,356,337 | 12/1967 | Olen | 251/315 |
| 3,554,484 | 1/1971 | Gachot | 251/315 X |
| 2,861,773 | 11/1958 | Clade | 251/315 |
| 3,667,725 | 6/1972 | Scaramucci | 251/315 |
| 2,778,598 | 1/1957 | Bolling, Jr. | 251/333 X |
| 3,108,779 | 10/1963 | Anderson | 251/315 X |
| 3,504,886 | 4/1970 | Hulslander et al. | 251/328 X |
| 3,570,811 | 3/1971 | Kruschik | 251/315 |

*Primary Examiner*—Samuel Scott
*Attorney*—Dunlap, Laney, Hessin & Dougherty

[57] ABSTRACT

An improved ball valve wherein each annular valve seat comprises a stamped metal seat ring disposed in a respective end of the valve body with the inner periphery of the seat ring conforming to and sealingly engaging the valve ball. An elastomeric annular seal is bonded to the side of the seat ring adjacent the valve ball and sealingly engages the valve ball and the bore through the valve body. The outer periphery of the annular seal has a diameter greater than the bore and is deformed by the bore to provide sealing engagement therewith and to retain the annular valve seat in the valve body during shipment and assembly of the valve in a pipeline. An elastomeric annular seal bead is bonded to the side of the seat ring opposite the annular seal to provide sealing engagement between the valve and a pipe flange carried by the pipeline. In another form the stamped metal seat ring is sized and shaped to conform to the periphery of a relatively deep counterbore formed in the valve body. In another form a circumferential bead is formed on the outer periphery of the annular seal and matingly engages an annular groove formed in the bore through the valve body.

22 Claims, 7 Drawing Figures

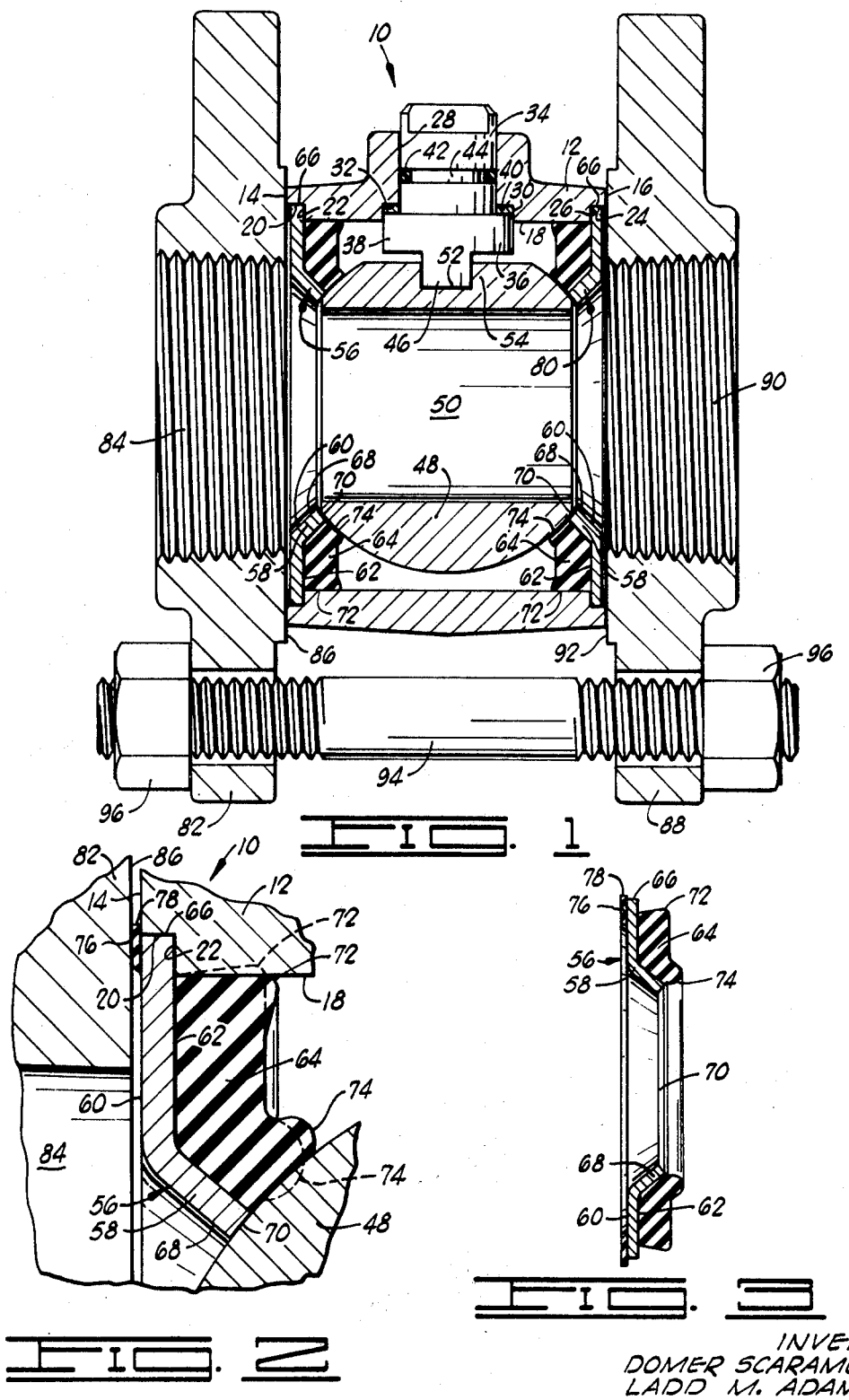

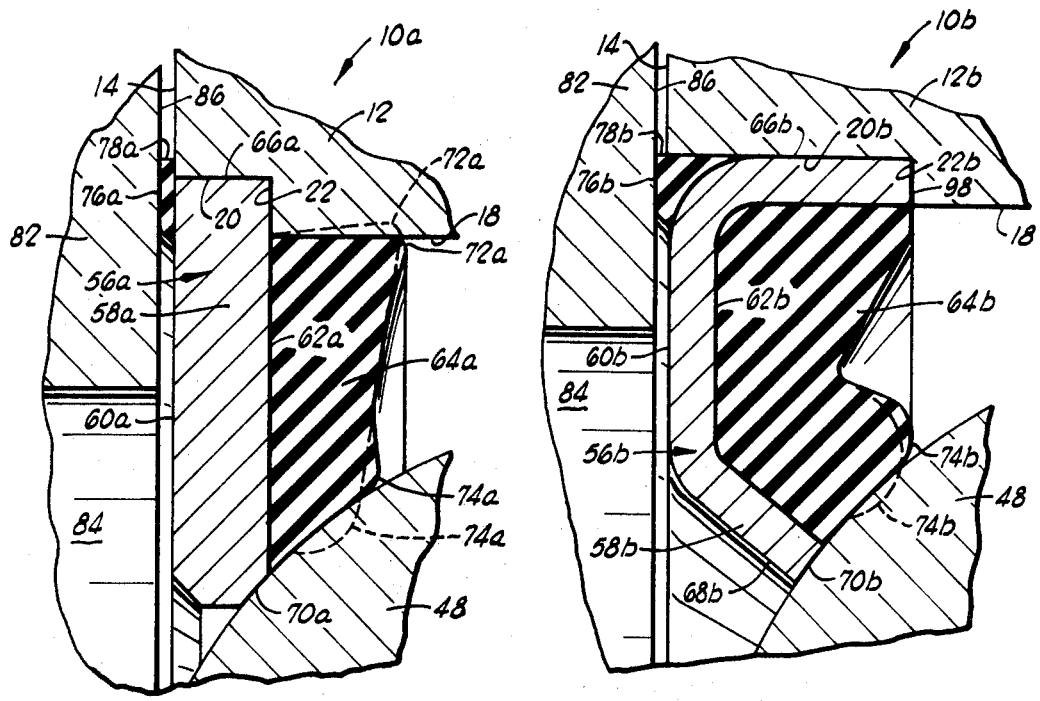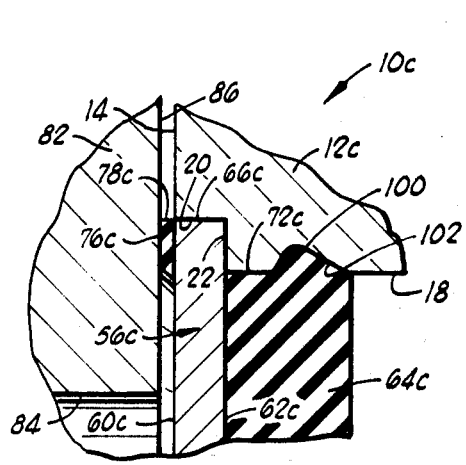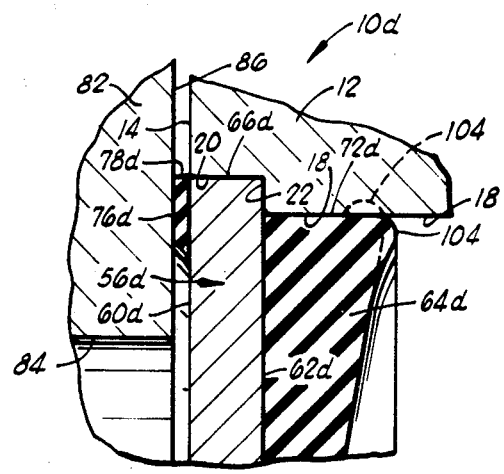

3,741,523

SEAT FOR BALL VALVE

BACKGROUND OF THE INVENTION

1. Field of Invention

This invention relates generally to improvements to ball valves. More particularly, but not by way of limitation, this invention relates to an improved seal and valve body structure for a ball valve.

2. Description of the Prior Art

Ball valves constructed in the past have generally utilized seat rings constructed of relatively hard materials, such as metal or synthetic resin with the seat ring fitting into the bore of the valve body. If such seat rings do not fit with slight interference with the valve body, then they tend to fall out during handling and shipping. The precise machining and fitting necessary to provide the interference fit between the seat rings and the valve body bore is expensive.

It is extremely important that the seat rings be retained in the valve body of between flange ball valves. In such ball valves, conventional end plates are not utilized thereby creating the need for some means for retaining the seat rings and the valve ball in the valve body during handling and shipping of the valve prior to its installation in a pipeline. Without some means for retaining between flange valves in assembled position it is quite likely that the valve ball might fall out of the valve body and be dented or scored thus destroying the valve.

SUMMARY OF THE INVENTION

The valve of the present invention comprises a valve body having upstream and downstream end faces and a bore extending therethrough intersecting said end faces. A valve member is movably disposed in the valve body with the valve member being movable between a position opening the bore and a position closing the bore. A counterbore is formed in the bore intersecting one end face of the valve body and a relatively rigid seat ring having a non-valve member side and a valve member side is disposed in the counterbore. The outer diameter of the seat is sized to slidingly fit within the counterbore and the inner periphery of the seat ring is sized and shaped to conform to and engage the valve member. A resilient annular seal is formed on the valve member side of the seat ring and sealingly engages the valve member.

An object of the present invention is to provide an improved ball valve wherein the annular valve seats are effectively retained in the valve body during handling and shipping.

Another object of the present invention is to provide an improved ball valve wherein a metal to metal seal is provided between the annular valve seats and the valve member to provide positive valve closure action when the valve is exposed to extremely high temperatures.

A further object of the present invention is to provide an improved ball valve having annular valve seats which can be quickly and easily installed and are effectively retained in the valve body.

One other object of the present invention is to provide an improved ball valve in which the annular valve seats can be quickly, easily and economically manufactured.

Other objects and advantages of the present invention will be evident from the following detailed description when read in conjunction with the accompanying drawings.

BRIEF DESCRIPTION OF THE DRAWINGS

FIG. 1 is a vertical cross-sectional view of a ball valve constructed in accordance with the present invention.

FIG. 2 is an enlarged fragmentary cross-sectional view of a portion of the valve of FIG. 1 illustrating the valve seat installed in the valve body and showing, by means of dashed lines, the configuration of the valve seat in the relaxed position.

FIG. 3 is a cross-sectional view of the valve seat of FIG. 1 in the relaxed position.

FIG. 4 is an enlarged fragmentary cross-sectional view similar to FIG. 2 illustrating another embodiment of the valve seat installed in the valve body.

FIG. 5 is an enlarged fragmentary cross-sectional view similar to FIG. 2 illustrating yet another embodiment of valve seat installed in the valve body.

FIG. 6 is an enlarged fragmentary cross-sectional view similar to FIG. 2 illustrating another embodiment of the valve seat installed in the valve body.

FIG. 7 is an enlarged fragmentary cross-sectional view similar to FIG. 6 illustrating still another embodiment of the valve seat installed in the valve body.

DESCRIPTION OF THE PREFERRED EMBODIMENT

Referring now to the drawings, and to FIGS. 1, 2 and 3 in particular, reference character 10 generally designates a constructed in accordance with the present invention. The valve 10 includes includes the valve body 12 having an upstream end face 14 and a downstream end face 16 formed on the opposite ends thereof. A bore 18 extends through the valve body 12 and intersects the upstream and downstream end faces 14 and 16.

A first counterbore 20 is formed in the bore 18 and intersects the upstream end face 14. The first counterbore 20 forms an annular wall 22 which interconnects the counterbore 20 and the bore 18. A second counterbore 24 is formed in the bore 18 and intersects the downstream end face 16. An annular wall 26 interconnects the second counterbore 24 and the bore 18.

A transverse bore 28 extends through the valve body 12 intersecting the bore 18. A counterbore 30 is formed in the bore 28 adjacent the intersection thereof with the bore 18 providing a planar surface 32 in the valve body 12.

A valve stem 34 extends through the bore 28 and includes a flange 36 formed on the inner portion 38 thereof. The flange 36 is positioned within the counterbore 30 adjacent the planar surface 32 and is separated therefrom by a bearing washer 40 encircling the valve stem 34. The bearing washer 40 is preferably constructed of a relatively resilient material such as Teflon. An O-ring seal 42 is positioned in an annular groove 44 encircling the valve stem 34 and sealingly engaging the valve stem 34 and the valve body 12 in the bore 28. A tongue 46 is formed on the inner portion 38 of the valve stem 34 for purposes which will be described more fully hereinafter.

A valve ball 48 having a port 50 formed therethrough is disposed within the bore 18 of the valve body 12. A rectangular recess 52 is formed on the upper portion 54 of the valve ball 48 and is sized to receive the tongue 46 formed on the valve stem 34.

A first annular valve seat 56 is disposed in the valve body 12 adjacent the upstream end face 14 thereof. The valve seat 56 comprises a relatively rigid seat ring 58 having a non-valve member side 60 and a valve member side 62 and having a resilient seal 64 bonded to the valve member side 62 thereof. The seat ring 58 is preferably formed of relatively thin sheet metal suitable for stamp-forming. The diameter of the outer periphery 66 of the seat ring 58 is sized to provide a sliding fit within the first counterbore 20 of the valve body 12. The portion of the valve member side 62 adjacent the outer periphery 66 engages the annular wall 22 formed by the counterbore 20.

The inner portion 68 of the seat ring 58 is substantially frusto-conical in shape with the inner peripheral surface 70 of the seat ring 58 being sized and shaped to conform to and engage the valve ball 48.

As shown in FIGS. 2 and 3, the outer periphery 72 of the annular seal 64 is sized and shaped such that the maximum diameter thereof is greater than the diameter of the bore 18 in the valve body 12. When the valve seat 56 is installed in the valve body 12 the outer periphery 72 of the annular seal 64 is deformed inwardly as shown in FIG. 2 thereby providing sealing engagement of the bore 18 by the annular seal 64. Note the configuration of the outer periphery 72 of the seal 64 in the relaxed position as illustrated by the dashed lines in FIG. 2. It should be noted that this sealing engagement of the bore 18 by the annular seal 64 also serves to retain the valve seat 56 within the valve body 12 in assembled position.

An annular bead 74 is formed about the inner periphery of the annular seal 64 proximate the inner peripheral surface 70 of the seat ring 58. As shown in FIG. 2, the annular bead 74 is sized and shaped to provide an interference fit with the valve ball 48 when the valve seat 56 is assembled in the valve body 12. Note the configuration of the annular bead 74 in the relaxed position as illustrated by the dashed lines in FIG. 2. When the valve seat 56 is installed in the valve body 12 the annular bead 74 is deformed and provides continuous sealing engagement with the valve ball 48.

As shown in FIGS. 2 and 3, a resilient annular seal bead 76 is bonded to the non-valve member side 60 of the seat ring 58 adjacent the outer periphery 66 thereof. The outer periphery 78 of the annular seal bead 76 has a diameter greater than the diameter of the first counterbore 20. It may be readily seen in FIG. 2 that this size relationship permits the annular seal bead 76 to extend outwardly over the upstream end face 14 of the valve body 12 for reasons which will be more fully described hereinafter.

A second annular valve seat 80 of a construction identical to the first annular valve seat 56 is disposed in the second counterbore 24 of the valve body 12. Since the construction of the second annular valve seat 80 is identical to the first annular valve seat 56 and is identically assembled in the valve body 12 it will not be described in detail.

It should be noted that the resilient annular seal 64 and the resilient annular seal bead 76 bonded to each seat ring 58 of the respective annular valve seats 56 and 80 are preferably formed of an elastomeric material such as rubber which may be readily molded and adhered to each seat ring 58.

It should also be noted that the size relationship of the outer periphery 72 of the annular seal 64 of each valve seat 56 and 80 to the bore 18 of the valve body 12 provides an effective means for retaining the valve ball 48 in its assembled position within the bore 18 and engaging the valve stem 34 thereby preventing the valve ball 48 from being dislodged from the valve body 12 during shipping and handling of the valve 10.

Referring again to FIG. 1, an upstream flange 82 having an aperture 84 formed therein and a downstream end face 86 formed thereon is positioned adjacent the upstream end face 14 of the valve body 12 with the downstream end face 86 sealingly engaging the annular seal bead 76 of the first annular valve seat 56. A downstream flange 88 having an aperture 90 formed therein and an upstream end face 92 formed thereon is positioned adjacent the downstream end face 16 of the valve body 12 with the upstream end face face 92 thereof sealingly engaging the resilient annular seal bead 76 of the second annular valve seat 80. A plurality of bolts 94 extend through the flanges 82 and 88, respectively, and are provided with threaded nuts 96 which are threaded onto the bolts 94 to move the flanges 82 and 88 relatively toward each other thereby retaining them in sealing engagement with the respective resilient annular seal beads 76.

It should be noted that the engagement of the annular seal beads 76 by the flanges 82 and 88, respectively, provides a fluid tight seal between the end faces 86 and 92 of the flanges 82 and 88 and the end face 14 and 16 of the valve body 12, respectively. At the same time, a fluid tight seal is formed between the end faces 86 and 92 and the seat rings 58 of the annular valve seats 56 and 80, respectively.

As is shown in FIG. 1, the valve 10 of the present invention provides metal to metal contact between the valve ball 48 and the inner peripheral surface 70 of the seat ring 58 of each annular valve seat 56 and 80. This construction assures that the valve 10, when closed, will continue to block the flow of fluid therethrough in the event the annular seals 64 are dissipated by exposure to extreme heat as may be caused by a fire.

DESCRIPTION OF THE EMBODIMENT OF FIG. 4

FIG. 4 illustrates another embodiment of the present invention in which the slightly modified valve 10a comprises many of the elements described above which will be designated by their previous reference characters. The valve 10a includes a slightly modified first annular valve seat 56a disposed in the valve body 12 adjacent the upstream end face 14 thereof. The valve seat 56a comprises a relatively rigid seat ring 58a having a non-valve member side 60a and a valve member side 62a and having a resilient seal 64a bonded to the valve member side 62a thereof. The seat ring 58a is preferably formed of relatively thin sheet metal suitable for stamping. The diameter of the outer periphery 66a of the seat ring 58a is sized to provide a sliding fit within the first counterbore 20 of the valve body 12. The portion of the valve member side 62a adjacent the outer periphery 66a engages the annular wall 22 formed by the counterbore 20.

The seat ring 58a is substantially flat and has an inner peripheral surface 70a sized and shaped to conform to and engage the valve ball 48.

The outer periphery 72a of the annular seal 64a is sized and shaped such that the maximum diameter thereof is greater than the diameter of the bore 18 in the valve body 12. When the valve seat 56a is installed in the valve body 12 the outer periphery 72a of the annular seal 64a is deformed inwardly thereby providing sealing engagement of the bore 18 by the annular seal 64a. Note the configuration of the outer periphery 72a of the seal 64a in the relaxed position as illustrated by the dashed lines. It should be noted that the sealing engagement of the bore 18 by the annular seal 64a also serves to retain the valve seat 56a within the valve body 12 in assembled position.

An annular bead 74a is formed about the inner periphery of the annular seal 64a proximate to the inner peripheral surface 70a of the seat ring 58a. The annular bead 74a is sized and shaped to provide an interference fit with the valve ball 48 when the valve seat 56a is asembled in the valve body 12. Note the configuration of the annular bead 74a in the relaxed position as illustrated by the dashed lines. When the valve seat 56a is installed in the valve body 12 the annular bead 74a is deformed and provides continuous sealing engagement with the valve ball 48.

A resilient annular seal bead 76a is bonded to the non-valve member side 60a of the seat ring 58a adjacent the outer periphery 66a thereof. The outer periphery 78a of the annular seal bead 76a has a diameter greater than the diameter of the first counterbore 20. It may be readily seen that this size relationship permits the annular seal bead 76a to extend outwardly over the upstream end face 14 of the valve body 12 for reasons which will be more fully described hereinafter.

It should be noted that the resilient annular seal 64a and the resilient annular seal bead 76a bonded to the seat ring 58a of the valve seat 56a are preferably formed of an elastomeric material such as rubber which may be readily molded and adhered to the seat ring 58a.

It should also be noted that the size relationship of the outer periphery 72a of the annular seal 64a of the annular valve seat 56a to the bore 18 of the valve body 12 provides an effective means for retaining the valve ball 48 in its assembled position engaging the valve stem 34 within the bore 18 thereby preventing the valve ball 48 from being dislodged from the valve 12 during shipping and handling of the valve 10a.

An upstream flange 82 having an aperture 84 formed therein and a downstream end face 86 formed thereon is positioned adjacent the upstream end face 14 of the valve body 12 with the downstream end face 86 sealingly engaging the annular seal bead 76a of the annular valve seat 56a. The engagement of the annular seal bead 76a by the flange 82 provides a fluid tight seal between the end face 86 and the end face 14 of the valve body 12. At the same time, a fluid tight seal is formed between the end face 86 and the seat ring 58a of the annular valve seat 56a.

The valve 10a of the present invention provides metal to metal contact between the valve ball 48 and the inner peripheral surface 70a of the seat ring 58a of the annular valve seat 56a.

DESCRIPTION OF THE EMBODIMENT OF FIG. 5

FIG. 5 illustrates another embodiment of the present invention in which the slightly modified valve 10b comprises many of the elements described above which will be designated by their previous reference characters. In the valve 10b a slightly modified annular valve seat 56b is disposed in the slightly modified valve body 12b adjacent the upstream end face 14 thereof. The valve body 12b differs from the valve body 12 in that the first counterbore 20b formed therein is appreciably deeper than the previously described first counterbore 20.

The valve seat 56b comprises a relatively rigid seat ring 58b having a non-valve member side 60b and a valve member side 62b and having a resilient seal 64b bonded to the valve member side 62b thereof. The seat ring 58b is preferably formed of relatively thin sheet metal suitable for stamp-forming. The seat ring 58b is substantially cup-shaped in cross-section with the outer periphery 66b thereof being sized to provide a sliding fit within the counterbore 20b of the valve body 12b. An annular end face 98 is formed on the seat ring 58b intersecting the outer periphery 66b thereof. The annular end face 98 engages the annular wall 22b formed by the slightly modified counterbore 20b.

The inner portion 68b of the seat ring 58b is substantially frusto-conical in shape with the inner peripheral surface 70b of the seat ring 58b being sized and shaped to conform to and engage the valve ball 48.

An annular bead 74b is formed about the inner periphery of the annular seal 64b proximate the inner peripheral surface 70b of the seat ring 58b. The annular bead 74b is sized and shaped to provide an interference fit with the valve ball 48 when the valve seat 56b is assembled in the valve body 12b. Note the configuration of the annular bead 74b in the relaxed position as illustrated by the dashed lines. When the valve seat 56b is installed in the valve body 12b the annular bead 74b is deformed and provides continuous sealing engagement with the valve ball 48.

A resilient annular seal bead 76b is bonded to the non-valve member side 60b of the seat ring 58b adjacent the outer periphery 66b thereof. The outer periphery 78b of the annular seal bead 76b has a diameter substantially equal to the diameter of the outer periphery 66b of the seat ring 58b.

It should be noted that the resilient annular seal 64b and the resilient annular seal bead 76b bonded to the seat ring 58b are preferably formed of an elastomeric material such as rubber which may be readily molded and adhered to each seat ring 58b.

An upstream flange 82 having an aperture 84 formed therein and a downstream end face 86 formed thereon is positioned adjacent the upstream end face 14 of the valve body 12b with the downstream end face 86 sealingly engaging the annular seal bead 76b of the annular valve seat 56b.

It should be noted that the engagement of the annular seal bead 76b by the flange 82 provides a fluid tight seal between the end face 86 and the seat ring 58b of the annular valve seat 56b. It should be further noted that the engagement of the annular seal bead 76 by the flange 82 also provides a fluid tight seal between the seat ring 58b and the counterbore 20b due to the deformation of the seal bead 76b by the flange 82.

The valve 10b provides metal to metal contact between the valve ball 48 and the inner peripheral surface 70b of the seat ring 58b of each annular valve seat 56b. This construction assures that the valve 10b, when closed, will continue to block the flow of fluid therethrough in the event the annular seals 64b are dissipated by exposure to extreme heat as may be caused by a fire.

DESCRIPTION OF THE EMBODIMENT OF FIG. 6

FIG. 6 illustrates another embodiment of the present invention in which the slightly modified valve 10c comprises many of the elements described for the valve 10 which will be designated by their previous reference characters. The valve 10c includes a slightly modified first annular valve seat 56c similar to the previously described valve seat 56, disposed in a slightly modified valve body 12c adjacent the upstream end face 14 thereof. The valve seat 56c comprises a relatively rigid seat ring 58c having a non-valve member side 60c and a valve member side 62c and having a resilient seal 64c bonded to the valve member side 62c thereof. The seat ring 58c is preferably formed of relatively thin sheet metal suitable for stamp-forming. The diameter of the outer periphery 66c of the seat ring 58c is sized to provide a sliding fit within the first counterbore 20 of the valve body 12c. The portion of the valve member side 62c adjacent the outer periphery 66c engages the annular wall 22 formed by the counterbore 20 in the valve body 12c.

The outer periphery 72c of the annular seal 64c has a circumferential bead 100 formed thereon which is sized and shaped to be matingly received in an annular groove 102 formed in the bore 18 of the valve body 12c. When the valve seat 56c is installed in the valve body 12c the circumferential bead 100 of the annular seal 64c is temporarily deformed inwardly until the seat ring 48c is properly seated in the counterbore 20. At this time the circumferential bead 100 is properly aligned with the annular groove 102 and matingly and sealingly engages the annular groove 102 thereby providing a fluid tight seal between the seat ring 58c and the valve body 12c. It should be noted that the sealing engagement of the annular groove 102 by the circumferential bead 100 serves to retain the valve seat 56c within the valve body 12c in assembled position.

A resilient annular seal bead 76c is bonded to the non-valve member side 60c of the seat ring 58c adjacent the outer periphery 66c thereof. The outer periphery 78c of the annular seal bead 76c has a diameter substantially equal to the diameter of the outer periphery 66c of the seat ring 58c.

It should be noted that the resilient annular seal 64c and the resilient annular seal bead 76c bonded to the seat ring 58c of the valve seat 56c are preferably formed of an elastomeric material such as rubber which may be readily molded and adhered to the seat ring 58c.

An upstream flange 82 having an aperture 84 formed therein and a downstream end face 86 formed thereon is positioned adjacent the upstream end face 14 of the valve body 12c with the downstream end face 86 sealingly engaging the annular seal bead 76c of the annular valve seat 56c. The engagement of the annular seal bead 76c by the flange 82 provides a fluid tight seal between the end face 86 and the seat ring 58c of the valve seat 56c.

DESCRIPTION OF THE EMBODIMENT OF FIG. 7

FIG. 7 illustrates another embodiment of the present invention in which the slightly modified valve 10d comprises many of the elements described above for the valve 10 which will be designated by their previous reference characters. The valve 10d includes a slightly modified first annular valve seat 56d disposed in the valve body 12 adjacent the upstream end face 14 thereof. The valve seat 56d comprises a relatively rigid seat ring 58d having a non-valve member side 60d and a valve member side 62d and having a resilient seal 64d bonded to the valve member side 62d thereof. The seat ring 58d is preferably formed of relatively thin sheet metal suitable for stamp-forming. The diameter of the outer periphery 66d of the seat ring 58d is sized to provide a sliding fit within the first counterbore 20 of the valve body 12. The portion of the valve member side 62d adjacent the outer periphery 66d engages the annular wall 22 formed by the counterbore 20.

The outer periphery 72d of the annular seal 64d has a circumferential bead 104 formed thereon having a maximum diameter greater than the diameter of the bore 18 in the valve body 12. When the valve seat 56d is installed in the valve body 12, the circumferential bead 104 of the annular seal 64d is deformed inwardly thereby providing fluid tight sealing engagement of the bore 18 by the annular seal 64d. Note the configuration of the circumferential bead 104 of the seal 64d in the relaxed position as illustrated by the dashed lines. It should be noted that the sealing engagement of the bore 18 by the circumferential bead 104 of the annular seal 64d also serves to retain the valve seat 56d within the valve body 12 in assembled position.

A resilient annular seal bead 76d is bonded to the non-valve member side 60d of the seat ring 58d adjacent the outer periphery 66d thereof. The outer periphery 78d of the annular seal bead 76d has a diameter substantially equal to the diameter of the outer periphery 66d of the seat ring 58d.

It should be noted that the resilient annular seal 64d and the resilient annular seal bead 76d bonded to the seat ring 58d of valve seat 56d are preferably formed of an elastomeric material such as rubber which may be readily molded and adhered to the seat ring 58d.

An upstream flange 82 having an aperture 84 formed therein and a downstream end face 86 formed thereon is positioned adjacent the upstream end face 14 of the valve body 12 with the downstream end face 86 sealingly engaging the annular seal bead 76d of the annular valve seat 56d. The engagement of the annular seal bead 76d by the flange 82 provides a fluid tight seal between the end face 86 and the seat ring 58d of the annular valve seat 56d.

It should be understood that the valve seats illustrated in FIGS. 4, 5, 6 and 7 may be installed in the corresponding valve body as either upstream or downstream valve seats; the downstream installation being substantially identical to the upstream installation. Therefore, detailed descriptions of downstream installation of the embodiments of FIGS. 4, 5, 6 and 7 have been omitted.

From the foregoing detailed description of the various embodiments of seats for ball valves, it can be readily seen that the present invention provides an improved ball valve wherein the annular valve seats are effectively retained in the valve body during shipping and handling, and wherein a metal to metal seal is provided between the annular valve seats and the valve member to provide positive valve action when the valve is exposed to extremely high temperatures. It may further be readily seen that a valve constructed in accordance with the present invention provides valve seats which can be quickly and easily installed, are effectively retained in the valve body, and which can be quickly, easily and economically manufactured.

Changes may be made in the construction and arrangement of parts or elements of the various embodiments as disclosed herein without departing from the spirit and scope of the present invention.

What is claimed is:

1. A valve comprising:
    a valve body having a first end face, a second end face, and a bore extending therethrough intersecting said end faces;
    a valve member movably disposed in said valve body, said valve member being movable between a position opening the bore and a position closing the bore;
    a first counterbore formed in the bore and intersecting the first end face of said valve body;
    a relatively rigid first seat ring having a non-valve member side and a valve member side and disposed in said first counterbore, the outer diameter of said first seat ring being sized to slidingly fit within said first counterbore, and the inner periphery of said first seat ring being sized and shaped to conform to and engage said valve member; and
    a first resilient annular seal formed on the valve member side of said first seat ring and sealingly engaging said valve member.

2. The valve as defined in claim 1 characterized further to include:
    a resilient annular seal bead of an elastomeric material and bonded to the non-valve member side of said first seat ring;
    a first end plate having an aperture formed therethrough and having an end face formed thereon, said first end plate being rigidly secured to said valve body with the end face thereof sealingly engaging said resilient annular seal bead; and
    wherein said first seat ring is formed of metal and said first resilient annular seal is formed of an elastomeric material, said first resilient annular seal being bonded to said first seat ring.

3. The valve as defined in claim 1 wherein said first resilient annular seal sealingly engages the bore extending through said valve body.

4. The valve as defined in claim 3 wherein the maximum outer diameter of said first resilient annular seal is greater than the diameter of the bore extending through said valve body.

5. The valve as defined in claim 1 characterized further to include:
    a resilient annular seal bead formed on the non-valve member side of said first seat ring; and
    a first end plate having an aperture formed therethrough and having an end face formed thereon, said first end plate being rigidly secured to said valve body with the end face thereof sealingly engaging said resilient annular seal bead.

6. The valve as defined in claim 5 wherein the outer diameter of said annular seal bead is substantially equal to the outer diameter of said first seat ring.

7. The valve as defined in claim 5 wherein the outer diameter of said resilient annular seal bead is greater than the outer diameter of said first counterbore.

8. The valve as defined in claim 1 characterized further to include:
    a second counterbore formed in the bore and intersecting the second end face of said valve body;
    a relatively rigid second seat ring having a non-valve member side and a valve member side and disposed in said second counterbore, the outer diameter of said second seat ring being sized to slidingly fit within said second counterbore, and the inner periphery of said second ring being sized and shaped to conform to and engage said valve member; and
    a second resilient annular seal formed on the valve member side of said second seat ring and sealingly engaging said valve member.

9. The valve as defined in claim 8 characterized further to include:
    a first resilient annular seal bead formed on the non-valve member side of said first seat ring;
    a first end plate having an aperture formed therethrough having an end face formed thereon, said first end plate being rigidly secured to said valve body with the end face thereof sealingly engaging said first resilient annular seal bead;
    a second resilient annular seal bead formed on the non-valve member side of said second seat ring; and
    a second end plate having an aperture formed therethrough and having an end face formed thereon, said second end plate being rigidly secured to said valve body with the end face thereof sealingly engaging said second resilient annular seal bead.

10. The valve as defined in claim 9 wherein the outer diameter of said first annular seal bead is substantially equal to the outer diameter of said first seat ring, and the outer diameter of said second annular seal bead is substantially equal to the outer diameter of said second seat ring.

11. The valve as defined in claim 9 wherein the outer diameter of said first annular seal bead is greater than the outer diameter of said first counterbore, and the outer diameter of said second annular seal bead is greater than the outer diameter of said second counterbore.

12. The valve as defined in claim 1 wherein:
    the inner periphery of said relatively rigid seat ring is sized and shaped to sealingly engage said valve member; and
    said first resilient annular seal sealingly engages the bore extending through said valve body.

13. The valve as defined in claim 12 characterized further to include:
    an annular groove formed in the bore of said valve body proximate to said first counterbore; and
    a circumferential bead formed on the outer periphery of said first resilient annular seal, said circumferential bead being sized and shaped to matingly engage said annular groove.

14. The valve as defined in claim 12 characterized further to include:
    a first resilient annular seal bead formed on the non-valve member side of said first seat ring; and
    a first end plate having an aperture formed therethrough and having an end face formed thereon, said first endplate being rigidly secured to said valve body with the end face thereof sealingly engaging said first annular seal bead formed on the non-valve member side of said first seat ring.

15. The valve as defined in claim 14 characterized further to include:
    a second counterbore formed in the bore and intersecting the second end face of said valve body;

a relatively rigid second seat ring having a non-valve member side and a valve member side and disposed in said second counterbore, the outer diameter of said second seat ring being sized to slidingly fit within said second counterbore, and the inner periphery of said second seat ring being sized and shaped to conform to and sealingly engage said valve member;

a second resilient annular seal formed on the valve member side of said second seat ring and sealingly engaging the bore extending through said valve body;

a second resilient annular seal bead formed on the non-valve member side of said second seat ring; and a second end plate having an aperture formed therethrough and having an end face formed thereon, said second end plate being rigidly secured to said valve body with the end face thereof engaging said second resilient annular seal bead formed on the non-valve member side of said second seat ring.

16. A valve as defined in claim 15 wherein the maximum outer diameters of said first and second resilient annular seals are each greater than the diameter of the bore extending through said valve body whereby the outer peripheries of said first and second resilient annular seals are each deformed into fluid sealing engagement with the bore extending through said valve body when said first and second seat rings are disposed in said first and second counterbores, respectively.

17. The valve as defined in claim 16 wherein the outer diameter of said first annular seal bead is substantially equal to the outer diameter of said first seat ring, and the outer diameter of said second annular seal bead is substantially equal to the outer diameter of said second seat ring.

18. The valve as defined in claim 16 wherein the outer diameter of said first resilient annular seal bead is greater than the diameter of said first counterbore, and the outer diameter of said second resilient annular seal bead is greater than the diameter of said second counterbore.

19. The valve as defined in claim 1 wherein said first seat ring is formed of metal and said first resilient annular seal is formed of an elastomeric material.

20. The valve as defined in claim 19 wherein said first resilient annular seal is bonded to said first seat ring.

21. The valve as defined in claim 1 wherein the inner portion of said first seat ring is frusto-conical in shape.

22. The valve as defined in claim 21 wherein said first seat ring is substantially cup-shaped in cross-section with the outer periphery thereof being sized to provide a sliding fit within said first counterbore.

* * * * *